Patented Jan. 17, 1950

2,494,811

UNITED STATES PATENT OFFICE 2,494,811

BENZANTHRONE DICARBOXYLIC ACID COMPOUNDS

Theodor Holbro, Basel, Paul Sutter, Binningen, and Walter Kern, Sissach, Switzerland, assignors to Ciba Limited, a Swiss firm No Drawing. Application July 19, 1946, Serial No. 684,776. In Switzerland July 27, 1945

9 Claims. (Cl. 260—276)

According to this invention valuable vat dyestuffs are made by causing a benzanthrone dicarboxylic acid which is incapable of internal anhydride formation to react with one or more amines.

The requirement that the dicarboxylic acids serving as starting materials for the present process shall be incapable of internal anhydride formation is fulfilled, for example, when the carboxyl groups do not occupy ortho- or peri-positions relatively to one another. Otherwise these groups may occupy any desired positions and may be, for example, substituents in the Bz-nucleus or in the anthraquinone nucleus. As an example there may be mentioned benzanthrone-6-Bz1-dicarboxylic acid, and benzanthrone-2:6-dicarboxylic acid.

The reaction of such benzanthrone carboxylic acids with amines is advantageously conducted after converting the carboxylic acid groups into reactive derivatives of such groups, for example, into acid halide groups. Thus, two molecular proportions of the same amine or different amines may be caused to act either simultaneously or in succession upon 1 molecular proportion of a benzanthrone carboxylic acid containing two carboxylic acid groups or on an acid halide thereof, for example, the chloride. As amines there come into consideration, for example, aliphatic, hydroaromatic or aromatic amines, and especially amines containing vattable groups, for example at least one carbonyl group forming part of a ring and, in addition, at least three condensed six-membered carbon rings. Such amines may be anthraquinone derivatives or they may possess more highly condensed ring systems. Such amines are, for example, 1-amino-4-benzoylaminoanthraquinone, 1-amino-5-benzoylaminoanthraquinone, 1 - amino - 5 - benzoylamino - 8 - methoxyanthraquinone, 1-aminoanthraquinone, 1 - amino-4-methoxyanthraquinone, 1-amino-5-methoxyanthraquinone, 1-amino - 5 - chloroanthraquinone, 1-amino - 6 - chloroanthraquinone, 2-aminoanthraquinone, an aminopyranthrone, an aminodibenzanthrone, an amino-flavanthrone, an aminobenzanthrone, an aminoanthanthrone, an aminoanthrimide.

1-aminoanthraquinone-2-carboxylic acid ethyl ester, an amino-N-dihydroanthraquinone-azine, an amino-dibenzpyrene quinone, an amino-1:9-anthrapyrimidine, an amino-1:9-anthrapyridone, an amino-1:9-isothiazoleanthrone, an amino-1:9-pyrazolanthrone, 4 - amino - 1:2 - anthraquinone-benzacridone, and also substitution products of these compounds containing, for example, halogen atoms or alkyl or alkoxy groups.

It is of advantage to use vattable compounds which contain, for example, in ortho-position with respect to the reactive amino group, at least one substituent which is capable of leading to the formation of a heterocyclic ring. Such substituents are, for example, hydroxyl, nitro, mercapto or amino groups, and also halogen atoms. Depending on the conditions of reaction the formation of an oxazole, thiazole or imidazole ring may follow directly upon the reaction of the reactive carboxylic acid derivative, especially an acid halide, with or without the use of a special condensing agent, or if desired this may be brought about in a separate operation by a method in itself known. Thus, for example, oxazoles can be produced from carboxylic acid chlorides and ortho - hydroxy - aminoanthraquinones, for example 2-hydroxyamino-1-anthraquinone, accompanied by the splitting off of hydrogen halide and water, or from benzanthrone carboxylic acid chlorides and ortho-nitro-aminoanthraquinones (for example, 2-nitro-1-aminoanthraquinone) accompanied by the splitting off of hydrogen halide and nitrous acid or from brom-amino- (for example, 1:2-) anthraquinones accompanied by the splitting off of hydrogen chloride and hydrogen bromide.

Thiazoles are obtained, for example, by causing benzanthrone carboxylic acid chlorides to react with ortho-mercapto-aminoanthraquinones, for example, 1:2- or 2:1-mercapto-aminoanthraquinones. Finally, imidazoles can be obtained by the reaction of the same reactive benzanthrone carboxylic acid derivatives with ortho-diaminoanthraquinones or with ortho-nitro-aminoanthraquinones with reduction of the nitro group, or with ortho-halogen - aminoanthraquinones, especially those having a halogen atom in α-position, after reaction with ammonia or a primary amine.

The reaction of the benzanthrone carboxylic acid or its reactive derivative, the isolation of which is in many cases unnecessary, with the amine containing at least one reactive hydrogen atom is advantageously carried out by heating the components in a solvent or diluent, for example, di- or tri-chlorobenzene, nitrobenzene, naphthalene or chloronaphthalene, during which, as stated above, ring closure occurs in some cases.

The condensation products obtainable by the process of the invention may be treated with condensing agents and/or agents capable of introducing substituents, whereby further valuable products can be obtained. As such agents there may be mentioned for example, alkylating agents, halogens or agents yielding halogen, also acid or alkaline condensing agents, for example, aluminium halides, if desired in presence of a tertiary base, such as pyridine, or of potassium chloride or sodium chloride.

The new products may be purified by crystallization one or more times from organic solvents or by treatment with oxidizing agents, for example a solution of an alkali hypochlorite, a solution of sodium nitrite in an acid medium or a solution of a perborate. The products can be converted by known methods into leuco-derivatives, for example, sulfuric acid leuco-esters. The products of the invention are valuable vat dyestuffs, which can be used for example as pigments or for dyeing or printing animal fibers, such as wool and silk, but more especially vegetable fibers for example, cotton, linen, rayon and staple fibers of regenerated cellulose, and also superpoly-amides. The dyeings and prints produced therewith possess, in some cases, excellent fastness to washing, chlorine and boiling in alkali. There are obtained in particular, very valuable yellow dyestuffs.

The following examples illustrate the invention, the parts being by weight unless otherwise stated, and the relationship of parts by weight to parts by volume being the same as that of the kilogram to the liter:

Example 1

15.9 parts of benzanthrone-6:Bz1-dicarboxylic acid are converted into the acid chloride by heating with 20 parts of thionyl chloride in 1000 parts of dry dichlorobenzene. After removing the unconsumed thionyl chloride by distillation 34.2 parts of 1-amino-5-benzoylaminoanthraquinone are introduced at 150° C. After stirring for 2 hours at 150° C. dyestuff formation is complete. The whole is filtered with suction while warm, the filter residue is washed with ortho-dichlorobenzene and alcohol, and dried. The dyestuff of the formula

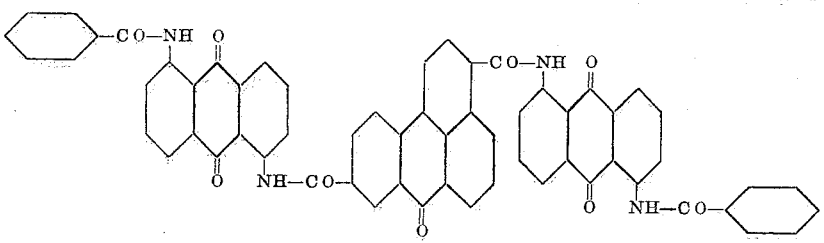

which is obtained in a very good yield, is a reddish-yellow powder which dissolves in concentrated sulfuric acid with an orange coloration, and dyes cotton from a red-brown vat powerful yellow tints. The properties of fastness of the dyestuff are very good.

The benzanthrone-6:Bz1-dicarboxylic acid used in this example may be obtained by the hydrolysis of 6:Bz1-dicyanobenzanthrone in alkaline or acid medium (see, for example, German Patent No. 467,118, Example 3). It is a yellow powder which melts at 390° C. with decomposition. In concentrated sulfuric acid it produces a yellow coloration having a strong yellow-green fluorescence.

Example 2

17.75 parts of benzanthrone-6:Bz1-dicarboxylic acid chloride are introduced into a solution of 34.2 parts of 1-amino-5-benzoylaminoanthraquinone in 1000 parts of dry ortho-dichlorobenzene at 150° C. After stirring for 2 hours at that temperature the reaction is complete. The whole is filtered with suction, while warm, the filter residue is washed with orthodichlorobenzene and alcohol, and dried. In this manner the same dyestuff as that of Example 1 is obtained.

The acid chloride used in this example may be prepared in the following manner:

15.9 parts of benzanthrone-6:Bz1-dicarboxylic acid, 320 parts of dry ortho-dichlorobenzene, 32 parts of thionyl chloride and 0.1 part of pyridine are heated to boiling in a reflux apparatus while stirring until dissolution is complete and hydrochloric acid is no longer evolved. Upon cooling the resulting benzanthrone-6:Bz1-dicarboxylic acid chloride crystallises. It is separated by filtering with suction, washed with ortho-dichlorobenzene and petroleum ether, and dried. The pale yellow crystals melt at 215° C.

Example 3

The procedure described in Example 1 or 2 is followed, except that the 1-amino-5-benzoyl-amino-anthraquinone is replaced by one of the amines in the following table, which table also gives the properties of the resulting dyestuffs:

| Amine: | Dyestuff: | | |
| --- | --- | --- | --- |
| | Coloration in sulfuric acid | Color of the vat | Dyeing on cotton |
| (a) 1-amino-anthraquinone | reddish-yellow | violet-brown | greenish-yellow. |
| (b) 1-amino-4-methoxy-anthraquinone | red | do | reddish-yellow. |
| (c) 1-amino-4-benzoyl-aminoanthraquinone | do | do | orange-brown. |
| (d) 4-aminoanthraquinone-1(N):2-benzacridone | reddish-yellow | red-brown | blue-green. |

Example 4

17.8 parts of benzanthrone-2:6-dicarboxylic acid chloride are poured at 100 C. into a solution of 22.3 parts of 1-aminoanthraquinone in 1000 parts of dry ortho-dichlorobenzene. After stirring for two hours at 150° C. the reaction is complete. The precipitated dyestuff is filtered off with suction while warm, washed with ortho-dichlorobenzene and alcohol, and dried. In this manner a yellow powder is obtained, which is illustrated by the formula

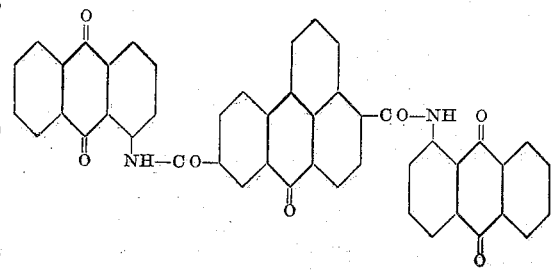

and which dissolves in concentrated sulfuric acid with orange-yellow coloration and dyes cotton from an olive vat greenish yellow tints.

The benzanthrone-2:6-dicarboxylic acid chloride used in this example may be produced as follows:

11.64 parts of 2:6-dibromobenzanthrone (cf. German Patent No. 471,021) are thoroughly mixed with 6 parts of cuprous cyanide, 2.7 parts of pyridine and 90 parts of nitrobenzene and then heated in a bomb tube for 12 hours to 175–185° C. The reaction product is suction-filtered in the cold state, the filter residue is washed with nitrobenzene and alcohol, boiled with dilute nitric acid, repeatedly suction-filtered, washed with water and dried. When recrystallized from nitrobenzene, the thus obtained 2:6-dicyanbenzanthrone is a pale yellowish-brown crystal powder which melts at 395–400° C.

25.8 parts of 2:6-dicyanbenzanthrone are dissolved in 355 parts of concentrated sulfuric acid, and 130 parts of water are carefully added. The saponification mixture is heated to 145–155° C. for 5 hours while stirring. The whole is then poured onto ice and the precipitated benzanthrone-2:6-dicarboxylic acid is filtered off with suction, washed with water and dried. It is a yellow powder which melts at 416° C. with decomposition.

15.9 parts of benzanthrone-2:6-dicarboxylic acid, 210 parts of ortho-dichlorobenzene, 27 parts of thionyl chloride and 0.1 part of pyridine are heated to the boil while stirring until dissolution is complete and hydrochloric acid is no longer evolved. Upon cooling, the benzanthrone-2:6-dicarboxylic acid chloride crystallizes. It is filtered off with suction, washed with dichlorobenzene and petroleum ether, and dried. The greenish yellow needles melt at a temperature above 200° C.

Example 5

Through the replacement, in Example 4, of 1-amino-anthraquinone by other amines, there are obtained the dyestuffs shown by this table:

| Amine: | Dyestuff: | | |
|---|---|---|---|
| | Color in Sulfuric acid | Vat color | Tint on cotton |
| (a) 2-amino-anthraquinone | yellow | brown | yellow. |
| (b) 1-amino-4-benzoylaminoanthraquinone | red | black-brown | orange. |
| (c) 1-amino-5-benzoylaminoanthraquinone | do | do | yellow. |
| (d) 1-amino-5-benzoylamino-8-methoxyanthraquinone | green | brown | orange. |
| (e) 1-amino-4-methoxyanthraquinone | red | yellowish brown | Do. |
| (f) 1-amino-5-methoxyanthraquinone | do | olive-brown | greenish yellow. |
| (g) 4-amino-1:1'-dianthrimide | red-brown | brown | reddish brown. |
| (h) 1-amino-5-chloroanthraquinone | yellow-red | olive-green | greenish yellow. |
| (i) 1-amino-6-chloroanthraquinone | do | olive | Do. |
| (k) 1-amino-7-chloroanthraquinone | do | olive-brown | Do. |
| (l) 4-aminoanthraquinone-1 (N): 2-benzacridone | brown | violet | olive-gray. |
| (m) 3-amino-1:2 (N)-pyridine-anthraquinone | yellow | red-brown | greenish yellow. |
| (n) 4-amino-1:9-anthrapyrimidine | yellow-red | olive-brown | Do. |

Example 6

By the simultaneous reaction of 1 molecular proportion of benzanthrone-2:6-dicarboxylic acid chloride with 1 molecular proportion of 1-amino-anthraquinone and with 1 molecular proportion of 1-amino-5-benzoyl-amino-anthraquinone by the method explained in Example 4 a yellow dyestuff powder is obtained which dissolves in concentrated sulfuric acid with a red coloration and dyes cotton from an olive vat yellow tints.

The resultant dyestuff is presumed to be a mixture of the dyestuff obtained according to Example 4 and the dyestuffs of the formulae

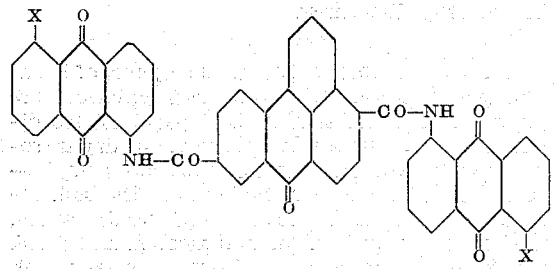

wherein one X means H and the other

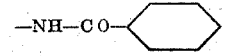

and

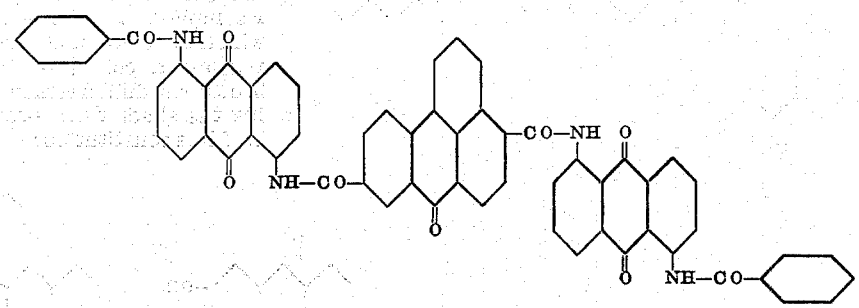

Example 7

17.1 parts of 1-amino-5-benzoylamino-anthraquinone, 17.8 parts of benzanthrone-6:Bz1-dicarboxylic acid chloride, 11 parts of pyridine and 1200 parts of dry nitrobenzene are stirred together at 45–55° C. until reaction is complete with all of the starting materials. There follow heating to 150° C., the addition of 20 parts of aniline and stirring for 2 hours at 150–160° C. in order to complete the formation of the dyestuff. The dyestuff, which has formed in several stages, is filtered off by suction while warm, washed with nitrobenzene and alcohol, and dried. It is represented by the formula

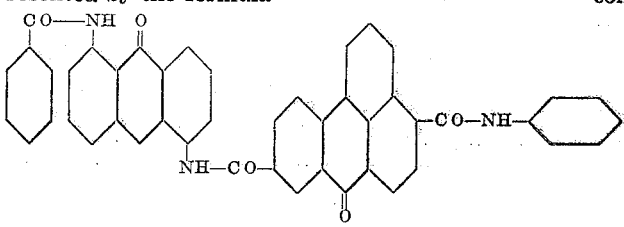

or

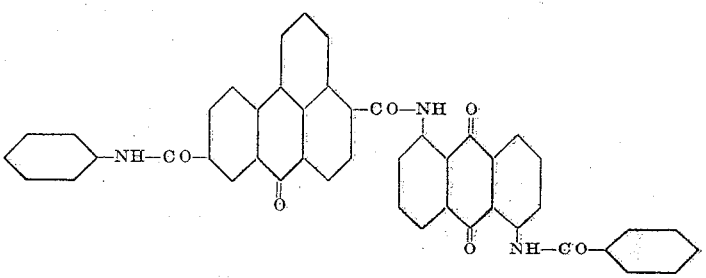

or a mixture of both. It is an orange-brown powder, dissolving in concentrated sulfuric acid with a red coloration and dyeing cotton from a red-brown vat yellow tints.

Example 8

At a temperature of 100° C., 17.8 parts of benzanthorne-6:Bz1-dicarboxylic acid chloride are poured into a solution of 23.8 parts of 1:2-diamino-anthraquinone in 1000 parts of dry nitrobenzene. After stirring for two hours at 150–160° C. and for another two hours at the boil, the reaction product is filtered off while warm, washed with nitrobenzene and alcohol, and dried. The resultant dyestuff is a brown powder which dissolves in concentrated sulfuric acid with red coloration and dyes cotton from a brown vat reddish yellow-brown tints. It is presumed to be of this constitution:

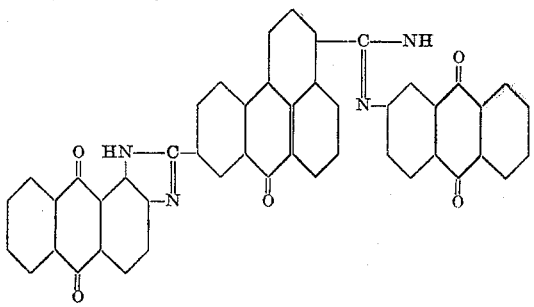

Example 9

4 parts of the reaction product from 1 molecular proportion of benzanthrone-6:Bz1-dicarboxylic acid chloride and 2 molecular proportions of 1-chloro-2-amino-anthraquinone (obtained according to the process explained in Example 2), 4 parts of copper acetate, and 60 parts of aniline are stirred for six hours while boiling under reflux. When the precipitated dyestuff has cooled off it is suction-filtered, washed with aniline and alcohol, boiled with hydrochloric acid, again suction-filtered, washed with water, and dried. It is a yellow-olive crystalline powder which dissolves in concentrated sulfuric acid with yellow-brown coloration and dyes cotton from a brown vat in greenish yellow tints. It is presumed to be of this constitution:

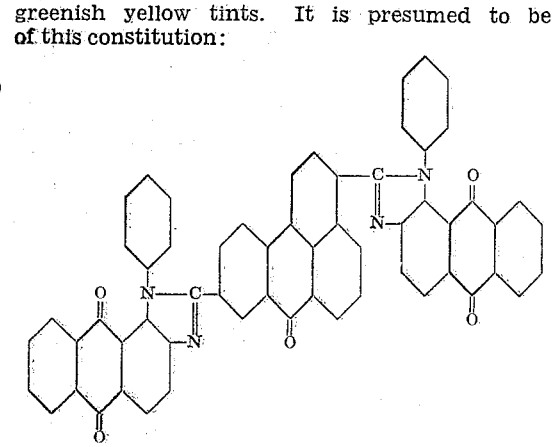

Example 10

Through the reaction of 1 molecular proportion of benzanthrone-6:Bz1-dicarboxylic acid chloride with 2 molecular proportions of 2:3-aminohydroxyanthraquinone by the process described in Example 2, a yellow-brown powder is obtained which dissolves in concentrated sulfuric acid with red-brown coloration and dyes cotton from a brown vat dull greenish yellow tints. Upon soaping the shade turns orange brown. The dyestuff is of this constitution:

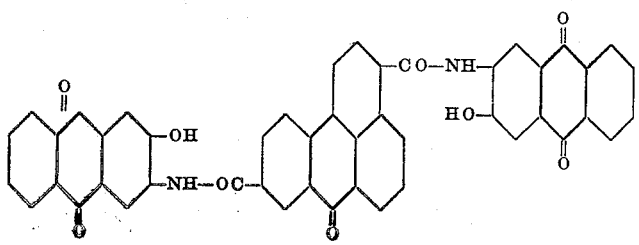

2 parts of this dyestuff are dissolved in 20 parts of sulfuric acid of 100 per cent. strength and heated for 10 minutes to 130–140° C., whereby the color of the solution is changed to brown with green fluorescence. When it has cooled off, it is poured onto ice, the precipitated dyestuff is filtered off with suction, washed and dried. It dyes cotton from an olive brown vat greenish yellow tints which are fast to soaping. It is presumed to be of this constitution:

orange tints. It is presumed to be of the following constitution:

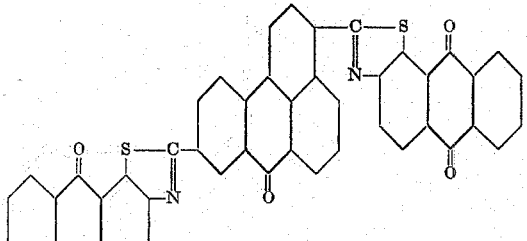

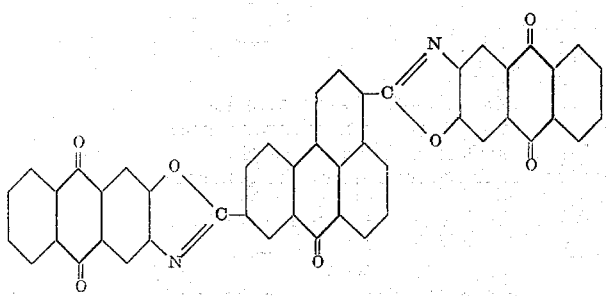

Example 11

At a temperature of 100° C. 17.8 parts of benzanthrone-6:Bz1-dicarboxylic acid chloride are poured into a solution of 25.6 parts of 1-mercapto-2-aminoanthraquinone in 1000 parts of dry trichlorobenzene. After stirring for two hours at 150–160° C. and for another two hours at the boil, the precipitated dyestuff is filtered off with suction while warm, washed with trichlorobenzene and alcohol and dried. It is an olive powder which dissolves in concentrated sulfuric acid with a brown coloration and dyes cotton from a red-brown vat orange-brown tints.

The dyestuff may be purified as follows:

2 parts of the crude product are reprecipitated from sulfuric acid and suspended in 200 parts of water. 20 parts of Javelle water of 14 per cent. strength are added and the whole is stirred at the boil until the color of the dyestuff does not become lighter any more. The dyestuff is suction-filtered, washed and dried. The purified dyestuff is a yellow-brown powder which dissolves in concentrated sulfuric acid with red-brown coloration and dyes cotton from a red-brown vat in

Example 12

39.9 parts of the dyestuff listed beside the letter $h$ in the table in Example 5, 34.2 parts of 1-amino-5-benzoyl-amino-anthraquinone, 15 parts of sodium carbonate, 15 parts of sodium acetate, 1.5 parts of cuprous chloride and 500 parts of dry nitrobenzene are stirred while being heated to the boil for 15 hours. The precipitated reaction product is filtered off with suction while warm, washed with nitrobenzene and alcohol, boiled with dilute hydrochloric acid, again suction-filtered, washed with water and dried. It is a black-brown powder which dyes cotton from a brown vat red brown tints. It dissolves in concentrated sulfuric acid with an olive coloration which soon turns violet. The dyestuff is of this constitution:

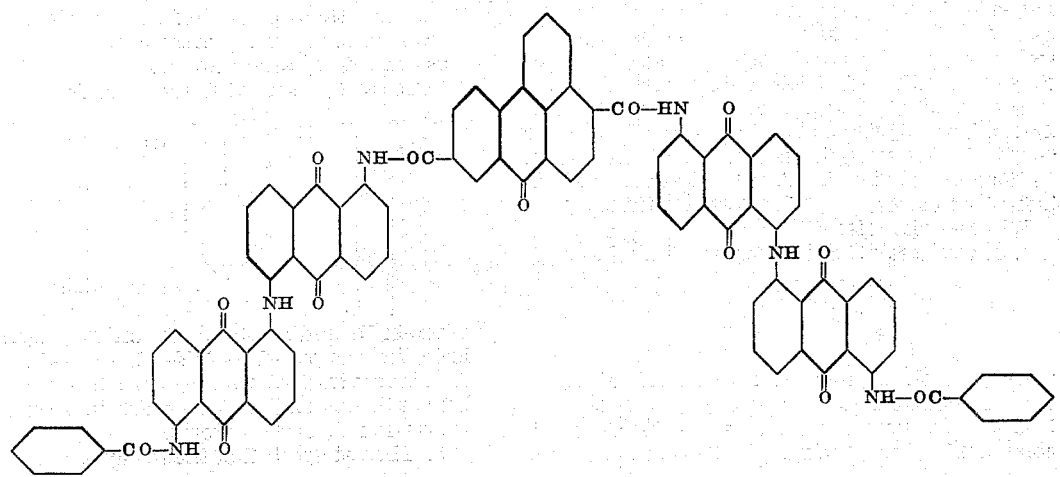

2 parts of this dyestuff are added to 20 parts of sulfuric acid of 96 per cent. strength whereby the color of the solution is changed from olive to violet. After stirring for 5 hours at 20° C. it is poured onto ice, 0.6 part of sodium nitrite is added and the whole is stirred for several hours at 0–5° C. The dyestuff is then suction-filtered, washed with water and made into a paste. It dyes cotton from a brown vat yellow-brown tints and is presumed to be of the constitution:

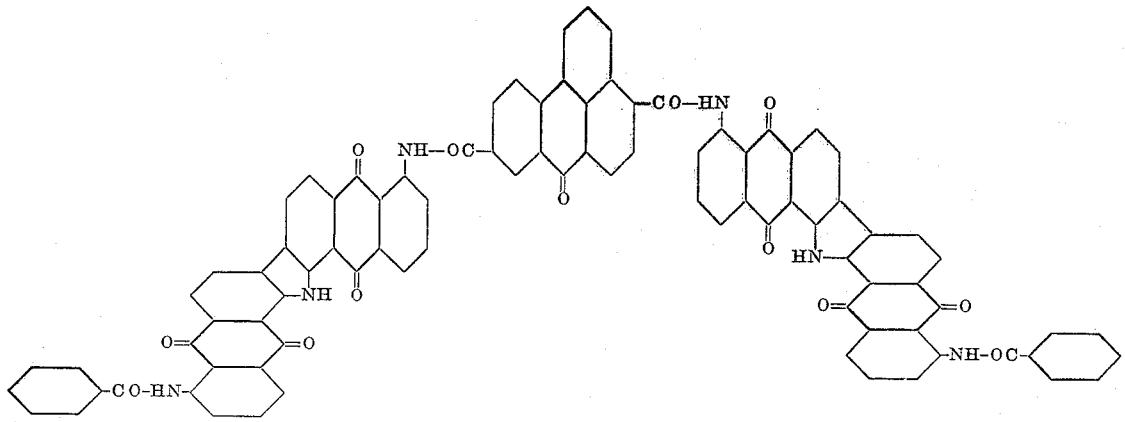

Carbazole ring closure can be brought about by treatment with sulfuric acid or by the action of aluminum chloride in nitrobenzene at 50° C. or by melting at 50° C. with the double-compound from aluminum chloride and sulfur dioxide (obtainable by introducing sulfur dioxide into a mixture of aluminum chloride and sodium chloride).

*Example 13*

18.2 parts of the dyestuff described in Example 4 are dissolved, with the addition of 0.1 part of iodine, in 250 parts of chlorosulfonic acid. 8.4 parts of bromine are added drop by drop at a temperature of 0-5° C. and the solution is stirred for 24 hours at 0-5° C. and for 15 hours at 20° C. After this, 500 parts of concentrated sulfuric acid are slowly run in, the mixture is poured onto ice, the precipitated product is filtered off with suction, washed with water and dried. The bromic dyestuff so obtained dyes cotton from an olive-brown vat greenish yellow tints.

*Example 14*

0.5 part of the dyestuff of Example 1 or 2 is thoroughly pasted with 4.5 parts by volume of caustic soda solution of 36° Bé. and 100 parts of water at 50-60° C., 1.2 parts of hydrosulfite are added and vatting is carried on for ½ hour at the same temperature. Into a dyebath of 700 parts of water are introduced 1.5 parts by volume of caustic soda solution of 36° Bé. and 1 part of hydrosulfite and also the stock vat, 30 parts of cotton are entered, dyeing is carried on for ¾ hour at 50-60° C., the material is unwound, oxidized for ½ hour in air, rinsed, acidified and soaped at the boil. The cotton is dyed fast yellow tints.

What we claim is:

1. A vat dyestuff of the general formula

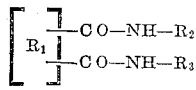

wherein $R_1$ stands for a benzanthrone radical and wherein $R_2$ and $R_3$ stand for aromatic radicals at least one of them being the radical of a vattable compound, the groups —CO—NH—$R_2$ and —CO—NH—$R_3$ being attached to ring carbon atoms of the benzanthrone radical which are separated by at least two ring carbon atoms.

2. A vat dyestuff of the general formula

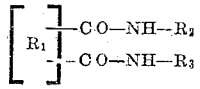

wherein $R_1$ stands for a benzanthrone radical and wherein $R_2$ and $R_3$ stand for radicals of vattable compounds, the groups —CO—NH—$R_2$ and —CO—NH—$R_3$ being attached to ring carbon atoms of the benzanthrone radical which are separated by at least two ring carbon atoms.

3. A vat dyestuff of the general formula

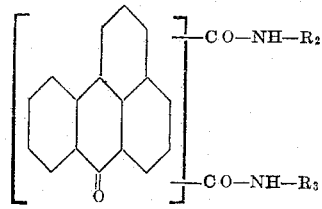

wherein $R_2$ and $R_3$ stand for radicals of vattable compounds containing the anthraquinone skeleton, the groups —CO—NH—$R_2$ and —CO—NH—$R_3$ being attached to ring carbon atoms of the benzanthrone radical which are separated by at least two ring carbon atoms.

4. A vat dyestuff of the general formula

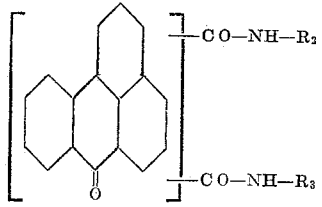

wherein $R_2$ and $R_3$ stand for anthraquinone radicals, the groups —CO—NH—$R_2$ and —CO—NH—$R_3$ being attached to ring carbon atoms of the benzanthrone radical which are separated by at least two ring carbon atoms.

5. The vat dyestuff of the formula

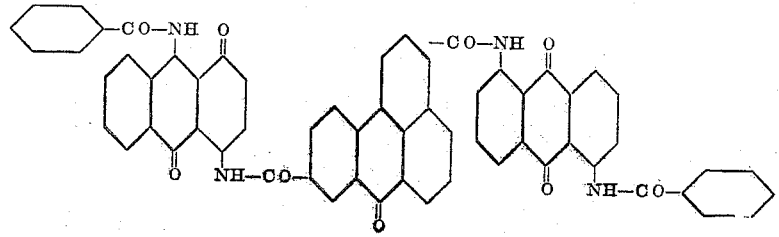

6. The vat dyestuff of the formula

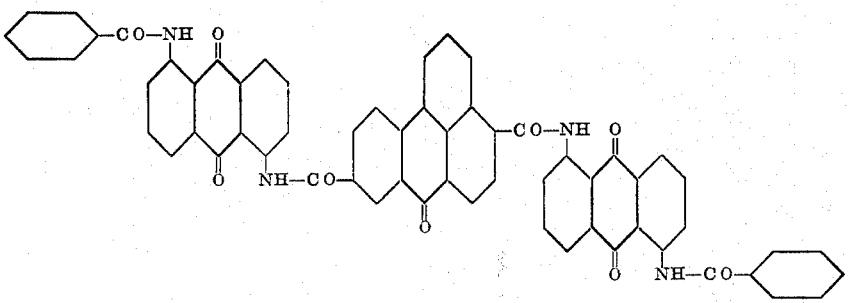

7. The vat dyestuff of the formula

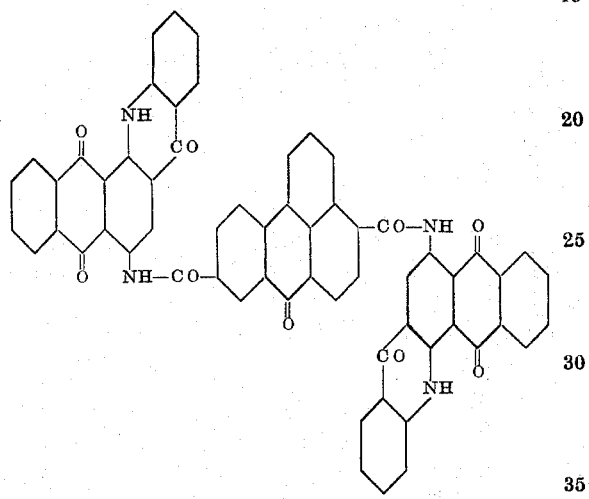

8. A vat dyestuff of the general formula

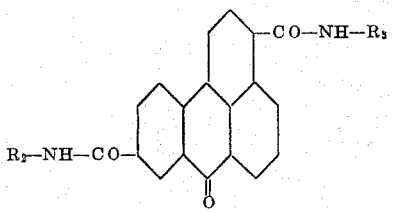

wherein $R_2$ and $R_3$ stand for anthraquinone radicals.

9. A vat dyestuff of the general formula

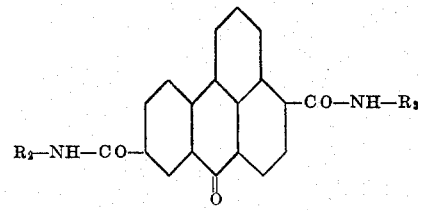

wherein $R_2$ and $R_3$ stand for anthraquinone radicals.

THEODOR HOLBRO.
PAUL SUTTER.
WALTER KERN.

REFERENCES CITED

The following references are of record in the file of this patent:

UNITED STATES PATENTS

| Number | Name | Date |
|---|---|---|
| 2,081,874 | Lycan | May 25, 1937 |
| 2,111,074 | Lycan | Mar. 15, 1938 |
| 2,155,360 | Lulek et al. | Apr. 18, 1939 |
| 2,459,941 | Holbro et al. | Jan. 25, 1949 |

FOREIGN PATENTS

| Number | Country | Date |
|---|---|---|
| 251,480 | Germany | Oct. 8, 1912 |

Certificate of Correction

Patent No. 2,494,811　　　　　　　　　　　　　　　　　　　　　January 17, 1950

THEODOR HOLBRO ET AL.

It is hereby certified that errors appear in the printed specification of the above numbered patent requiring correction as follows:

Column 1, line 46, after "aminoanthrimide" strike out the period and insert instead a comma; column 7, line 42, for "anthorne" read *anthrone*; lines 55 to 62, inclusive, for that portion of the formula reading

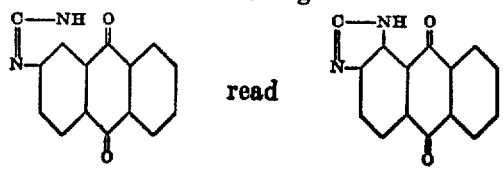

column 8, last formula, left hand portion thereof, for

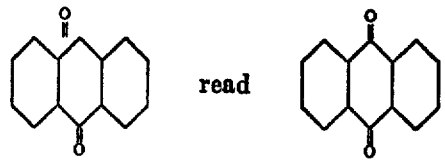

column 12, last formula, for that portion reading

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*